(12) United States Patent
Wilke

(10) Patent No.: US 8,320,116 B2
(45) Date of Patent: Nov. 27, 2012

(54) MULTI-USE REMOVABLE ELECTRONIC DATA STORAGE DEVICE CARRIER MODULE

(75) Inventor: Jeffrey David Wilke, Palmer Lake, CO (US)

(73) Assignee: Sanmina-SCI Corporation, San Jose, CA (US)

( * ) Notice: Subject to any disclaimer, the term of this patent is extended or adjusted under 35 U.S.C. 154(b) by 98 days.

(21) Appl. No.: 12/857,975

(22) Filed: Aug. 17, 2010

(65) Prior Publication Data

US 2011/0267764 A1 Nov. 3, 2011

Related U.S. Application Data

(60) Provisional application No. 61/329,291, filed on Apr. 29, 2010.

(51) Int. Cl.
*G06F 1/16* (2006.01)
(52) U.S. Cl. ............... 361/679.33; 248/419; 312/334.8; 360/97.02; 165/104.33
(58) Field of Classification Search ............. 361/695, 361/726, 679.33, 679.46, 679.5, 679.51; 248/404, 477, 544, 419, 124.1; 312/223.1, 312/223.2, 265.1, 334.8; 360/97.02, 69, 360/31; 165/104.33, 80.4, 104.13
See application file for complete search history.

(56) References Cited

U.S. PATENT DOCUMENTS

| 7,280,352 B2 * | 10/2007 | Wilson et al. ............ 361/679.33 |
| 2008/0013272 A1 * | 1/2008 | Bailey et al. ................. 361/685 |
| 2011/0069441 A1 * | 3/2011 | Killen et al. ............ 361/679.33 |

\* cited by examiner

*Primary Examiner* — Hung Duong
(74) *Attorney, Agent, or Firm* — Julio M. Loza; Loza & Loza, LLP

(57) ABSTRACT

A built-in dual purpose interposer device for a data storage device carrier mechanism is provided. The interposer device may fill empty or voided space in the carrier mechanism created when a data storage device is changed between a "direct plug" position, or first configuration, and an "interposer" position, or second configuration. The interposer device may be changed back and forth between the first and second configuration multiple times. When in the first configuration, the interposer device may provide structural support to a front end of the carrier mechanism and when in the second configuration, the interposer device may provide an internal mounting base for the data storage device at the base or bottom end of the carrier mechanism. The ability to interchange the interposer device may provide for a built-in base for attaching the interposer device without having to add in additional parts or costs.

20 Claims, 7 Drawing Sheets

MULTI-USE REMOVABLE ELECTRONIC DATA STORAGE DEVICE CARRIER MODULE

CLAIM OF PRIORITY UNDER 35 U.S.C. §119

The present Application for Patent claims priority to U.S. Provisional Application No. 61/329,291 entitled "Multi-Use Removable Electronic Data Storage Device Carrier Module", filed Apr. 29, 2010, assigned to the assignee hereof and hereby expressly incorporated by reference herein.

FIELD

Various features relate to improvements to data storage carriers, and more particularly, to a data storage device carrier mechanism that allows for storing an interposer device as part of the carrier mechanism

BACKGROUND

Multi data storage device enclosures (e.g., hard-drive device enclosures) often allow multiple storage devices to be removed and/or replaced as the user's needs may change. In order to accommodate the use of data storage devices from different manufacturers, storage device carriers may be used to hold the data storage devices. However, consumers may wish to use data storage devices (e.g., hard-drives) having different types of connection interfaces, for example, Serial Advanced Technology Attachment (SATA), Serial Attached SCSI (SAS), Universal Serial Bus (USB), etc. To accommodate such different types of interfaces, a passive or active interposer device may be used. That is, a device providing an electrical interface routing between one socket or connection to another may be used. Thus, depending on the type of data storage device interface selected by the consumer, the consumer may utilize one or more different types of interposer devices to electrically couple the data storage device to a data bus in the multi data storage device enclosure. Such interposer devices may serve to mechanically and/or electrically convert one type of interface to a second type of interface.

While it would be convenient to deploy the interposer device as part of the storage device carrier, a problem exists that when such interposer device is not in use, it may be misplaced and/or lost. Furthermore, if the data storage device is later replaced with one of a different interface type, the consumer would be unable to couple it to the data bus in the multi data storage device enclosure due to the missing interposer device. As a result, the user will have to purchase a new interposer device for the new data storage device. To accommodate the consumers, manufacturers need to maintain an inventory of different interposer devices which increases the costs and the tooling needed.

Consequently, a novel data storage device carrier mechanism that allows for storing the interposer device as part of the carrier mechanism is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a built-in dual purpose removable electronic data storage device carrier module for a data storage device is provided. The built-in dual purpose removable electronic data storage device carrier module, or interposer device, may fill empty or voided space in the carrier mechanism created when the data storage device is changed or switched between a "direct plug" position, or first configuration, and an "interposer" position, or second configuration. The interposer device may be changed back and forth between the first and second configurations multiple times. When in the first configuration, the interposer device may provide structural support to a front end of a carrier mechanism and when in the second configuration, the interposer device may provide an internal mounting base for the data storage device at a bottom end of the carrier mechanism and may be communicatively coupled to a data interface for the data storage device. The ability to interchange the interposer device may provide for a built-in base for attaching the interposer device without having to add in additional parts or costs. As a result, both a cost savings to the consumer and a simplified method of installing various interposer circuit boards are provided.

In one aspect, a data storage device carrier mechanism that is adapted or sized to fit within a multi storage device enclosure is provided. The data storage device may include first and second side rails that are adapted to attach to a data storage device, such as a hard drive. The first side rail may include a first rail top end and a first rail bottom end while the second side rail may include a second rail top end and a second rail bottom end. An interposer device may be coupled to the first and second side rails and may be interchanged between a first configuration and a second configuration. When in the first configuration, the interposer device may be coupled to the first rail top end and the second rail top end and when in the second configuration, the interposer device may be coupled to the first rail bottom end rail and the second rail bottom end when in the second configuration.

In another aspect, the data storage device carrier mechanism may include first and second attachment points located in the first and second side rails for securing the data storage device to the carrier mechanism. The first and second side rails may be shifted in position relative to the data storage device when changing between the first and second configurations. The data storage device may be secured at the first attachment point when in the first configuration and secured at the second attachment point when in the second configuration.

In yet another aspect, the interposer device may comprise a flat surface, first and second sidewalls and first and second end walls where the sidewalls and the end walls are integrally connected to, and extend continuously from, the flat surface. The first end wall may include one or more one integrally connected fastening members that extend outwardly for releasable engagement with one or more upper card attachment points in the first rail top end of the carrier mechanism when the interposer device is in the first configuration. The second end wall may include one or more one integrally connected fastening protrusions that extend outwardly for releasable engagement with one or more upper card attachment holes in the second rail top end of the carrier mechanism when the interposer device is in the first configuration.

In yet another aspect, to secure the interposer device to the second rail of the data storage device carrier mechanism, a fastener may be inserted through a hole in the second rail top end and into an aperture in the interposer device.

In yet another aspect, the first rail bottom end may include one or more lower card attachment points for receiving the one or more card fastening members located on the first end wall of the interposer device when the interposer device is in the second configuration. The second rail bottom end may include one or more lower card attachment points for receiving the one or more card fastening protrusions located on the second end wall of the interposer device when the interposer device is in the second configuration.

Additionally, a pull handle may be pivotably coupled to the first rail top end for sliding the data storage device in and out of the multi storage device enclosure using the pull handle. When the interposer device is assembled the first configuration, the pull handle is adapted to fit over the interposer device.

DETAILED DESCRIPTION

In the following detailed description, numerous specific details are set forth in order to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

In the following description, certain terminology is used to describe certain features of one or more embodiments. The term "fastener" or "fastening member" may refer to any type of device for connecting metal, plastic and other materials in common data storage device carrier construction, including screws, bolts, nuts, washers, rivets, cotter pins, clevis pins, studs, threaded rods and other mechanical connectors. The term "hole" may refer to any opening through a structure and/or component or a hollowed-out place in a structure and/or component, including apertures, bores, cavities, chambers, grooves, notches, passages, slits and slots. The term "protrusion" may refer to objects or parts projecting in an outward manner from a structure and/or component.

According to one aspect, a built-in dual purpose removable electronic data storage device carrier module for a data storage device carrier mechanism may be provided. The built-in dual purpose removable electronic data storage device carrier module, or interposer device, may fill empty or voided space in the carrier mechanism created when the data storage device is changed or switched between a "direct plug" position, or first configuration, and an "interposer" position, or second configuration. The interposer device may be changed back and forth between the first and second configurations multiple times. When in the first configuration, the interposer device may provide structural support to a front end of a carrier mechanism and when in the second configuration, the interposer device may provide an internal mounting base for the data storage device at a bottom end of the carrier mechanism. The ability to interchange the interposer device may provide for a built-in base for attaching the interposer device without having to add in additional parts or costs. As a result, both a cost savings to the consumer and a simplified method of installing various interposer circuit boards are provided.

Figure 1:
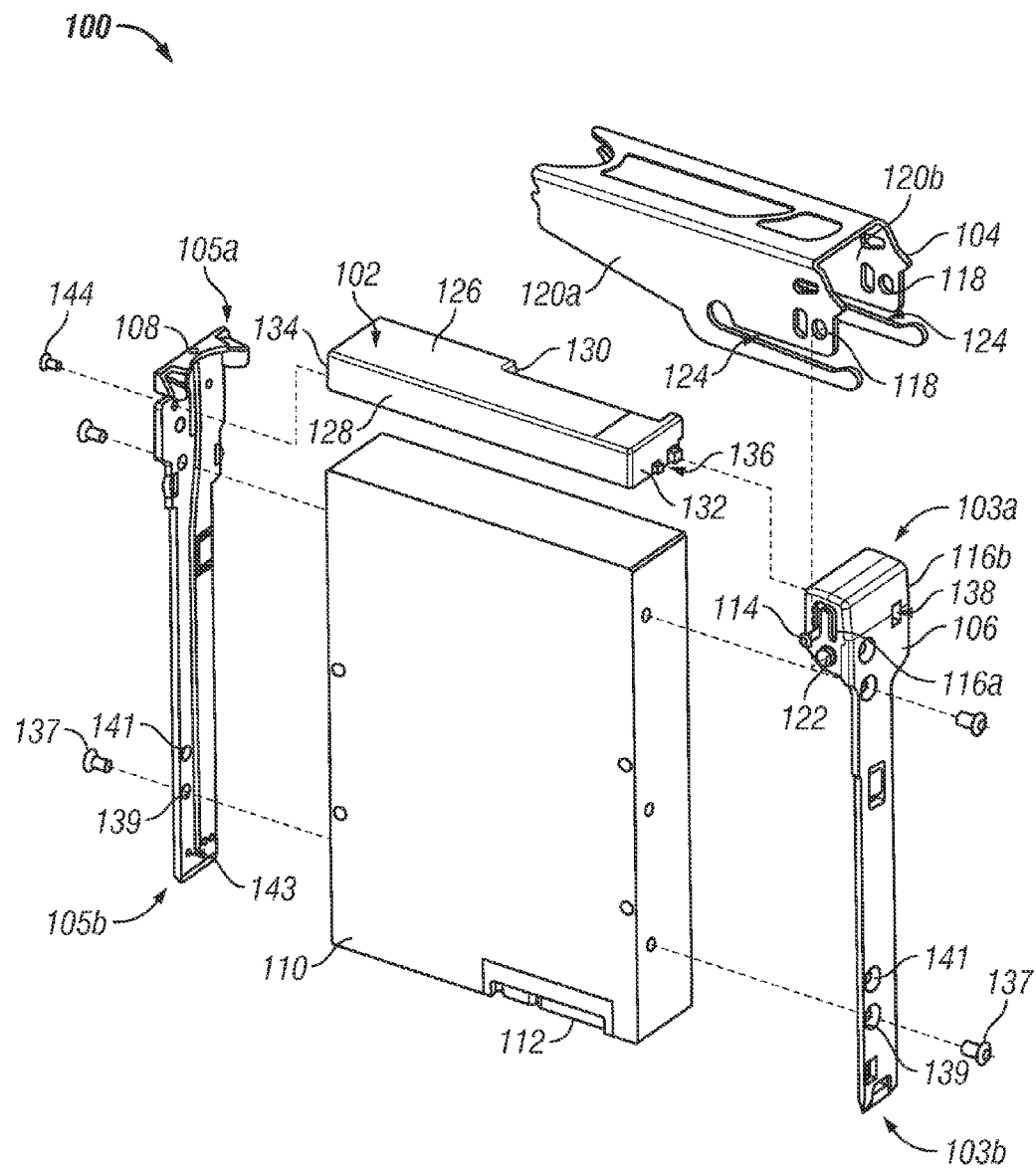
FIG. 1 illustrates an exploded perspective view of a carrier mechanism with a data storage device in a first configuration, according to one aspect.

FIG. 1 illustrates an exploded perspective view of a carrier mechanism 100 with a data storage device 110 in a first configuration, according to one aspect. The carrier mechanism may include first and second side rails 106 and 108, a pull handle 104, and an interposer device 102. The first side rail 106 may have a first rail top end 103a and a first rail bottom end 103b while the second side rail may have a second rail top end 105a and a second rail bottom end 105b.

The carrier mechanism 100 may be adapted or sized to fit within a multi storage device enclosure (not shown) and slide in and out of such enclosure using the pull handle 104. The pull handle 104, when installed, may be pivotably attached to the first rail top end 103a of the first side rail 106 so that the data storage device 110 (e.g., a hard drive) may be pulled or removed from within the multi storage device enclosure in which it may be housed. When the carrier mechanism is in the first configuration, the pull handle 104 may be pivotably coupled to the first side rail 106 over the interposer device 102. To secure the pull handle 104 to the first side rail 106, one or more attachment pins 114, extending outwardly from side portions 116a and 116b of the first rail top end 103a of the first side rail 106, may be received in attachment holes 118 in pull handle side portions 120a and 120b. Guide pins 122, extending outwardly from the side portions 116a and 116b of the first rail top end 103a below the one or more attachment pins 114, may be received in pull handle slots 124 extending horizontally, at least partially into the pull handle side portions 120a and 120b, when the pull handle 104 is installed. As the pull handle 104 is pivoted, the guide pins 122 may slideably engage the pull handle slots 124.

The interposer device 102 may be located between the first rail top end 103a and second rail top end 105a of the first and second side rails 106 and 108, in accordance with the first configuration, or located between the first rail bottom end 103b and second rail bottom end 105b of the first and second side rails 106 and 108, in accordance with a second configuration, as discussed in more detail below.

The interposer device 102 may be sold or distributed as part of the carrier mechanism and may be structurally integral with the carrier mechanism 100. When not in use as an interface, the interposer device 102 may be placed at a front end of the data storage device 110, in the first configuration, where, as described above, is coupled to the first rail top end 103a and the second rail top end 105a of the side rails 106 and 108. That is, the interposer device 102 may engage the top ends of the side rails 106 and 108 to provide structural rigidity for a front end of the carrier mechanism 100.

In one aspect, the interposer device 102 may include a flat surface 126 and two opposing sidewalls 128 and 130 integrally connected to two opposing end walls 132 and 134. The sidewalls, 128 and 130, and end walls, 132 and 134, may extend continuously from the flat surface 126 to form the interposer device 102. One or more of the sidewalls 128 and 130 may include an interface connector 135 (See FIG. 2) which may then be coupled to a data bus interface 112 at the back of the data storage device 110, when the carrier mechanism is in the second configuration.

The interposer device 102 may be sized such that it is received between the first side rail 106 and second side rail 108 of the carrier mechanism 100. In one aspect, the first end wall 132 of the interposer device 102 may include one or more card fastening members 136, extending outwardly and integrally connected to the first end wall 132, and the first side rail 106 may include one or more upper card attachment points 138 for receiving the one or more card fastening members 136 securing the interposer device 102 to the first rail top end 103a of the first side rail 106.

In one aspect, the second end wall 134 of the interposer device 102 may include one or more card fastening protrusions 140 (See FIG. 3) and the second side rail 108 may include one or more card upper attachment holes 142 (See FIG. 4) for receiving the one or more card fastening protrusions 140 coupling the interposer device 102 to the second rail top end 105a of the second side rail 108. Once coupled together, a fastener 144 may be inserted through a hole 146 in the second rail top end 105a of the second side rail 108 and into an aperture 148 (See FIG. 3) in the second end wall 134 for securing the second side rail 108 to the interposer device 102.

Figure 2:
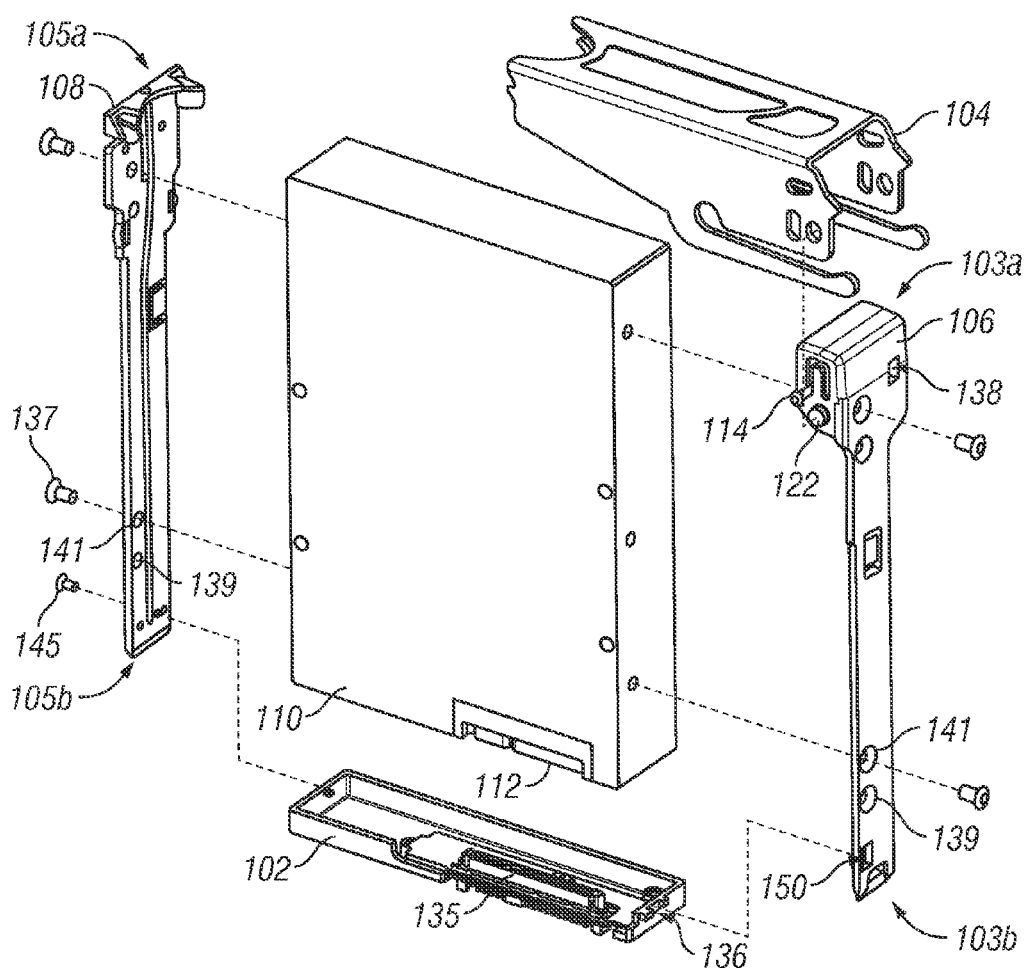
FIG. 2 illustrates an exploded perspective view of a carrier mechanism with a data storage device in a second configuration, according to one aspect.

FIG. 2 illustrates an exploded perspective view of the carrier mechanism with the data storage device in the second configuration, according to one aspect. In the second configuration, when the interposer device 102 is in use, it may be removed from the front end of the data storage device 110 and moved to the back end. The interface connector 135 may then be coupled to the data bus interface 112 at the back of the data storage device 110. That is, the interposer device 102 may be detached from the first rail top end 103a and the second rail top end 105a, inverted and then attached to the first rail bottom end 103b and the second rail bottom end 105b. In order to accommodate the repositioning of the interposer device 102 to the back of the data storage device 110, the first and second side rails 106 and 108 may be shifted down. For this purpose, the side rails 106 and 108 may include different attachment points. For instance, fasteners 137 to the data storage device 110 may be moved from a first attachment point 139 to a second attachment point 141.

Figure 3:
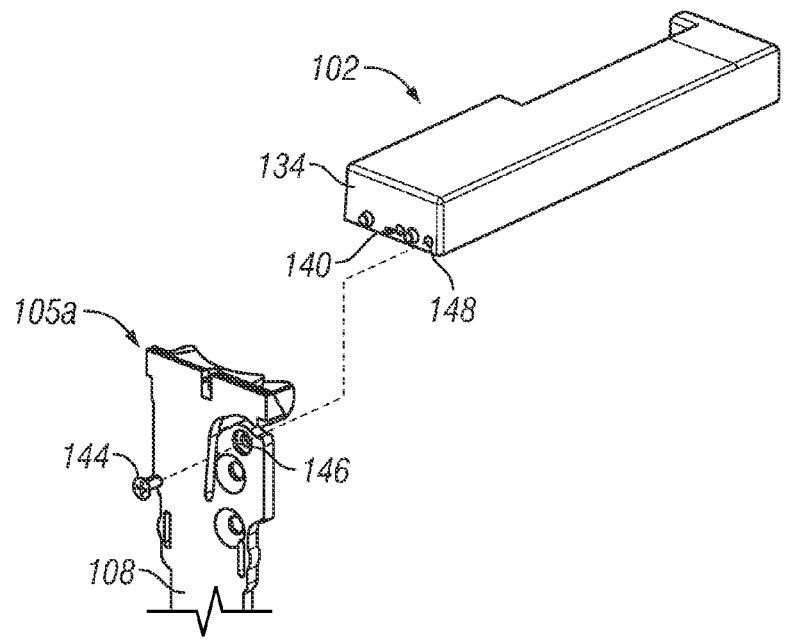
FIG. 3 illustrates a close-up outer side perspective view of the interposer device coupling to a first side rail in FIG. 1.

FIG. 3 illustrates a close-up outer side perspective view of the interposer device coupling to the second side rail 108 when in the first configuration, i.e. not in use (as illustrated in FIG. 1). As discussed previously, the interposer device 102 may be coupled to the second side rail 108 by inserting the one or more card fastening protrusions 140 of the interposer device 102 into one or more card upper attachment holes 142 (See FIG. 4) in the second rail top end 105a. Once coupled together, the fastener 144 may be inserted through the hole 146 in the second rail top end 105a of the second side rail 108 and into the aperture 148 in the second end wall 134 of the interposer device 102 for securing the second side rail 108 to the interposer device 102. In one aspect, when securing the interposer device 102 to the second side rail 108, rotational force may be applied to the fastener 144 once the fastener 144 has been inserted. For example, the fastener 144 may be rotated clockwise when securing the side rail 108 to the interposer device 102 and may be rotated counter-clockwise when disassembling the side rail 108 from the interposer device 102.

Figure 4:
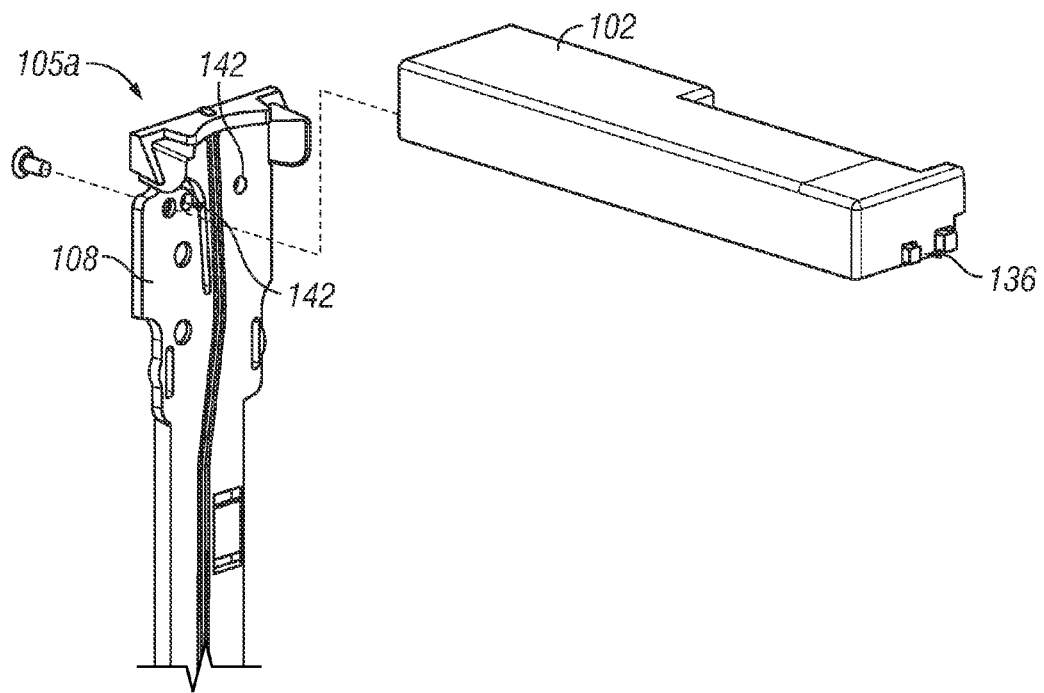
FIG. 4 illustrates a close-up inner side perspective view of the interposer device coupling to a second side rail in FIG. 1.

FIG. 4 illustrates a close-up inner side perspective view of the interposer device 102 coupling to the second side rail 108 when in the first configuration, i.e. not in use (as illustrated in FIG. 1). As discussed above with reference to FIG. 3, when coupling the interposer device 102 to the second side rail 108, the fastener 144 may be inserted through the hole 146 and come into engagement with the aperture 148 in the interposer device 102.

Figure 5:
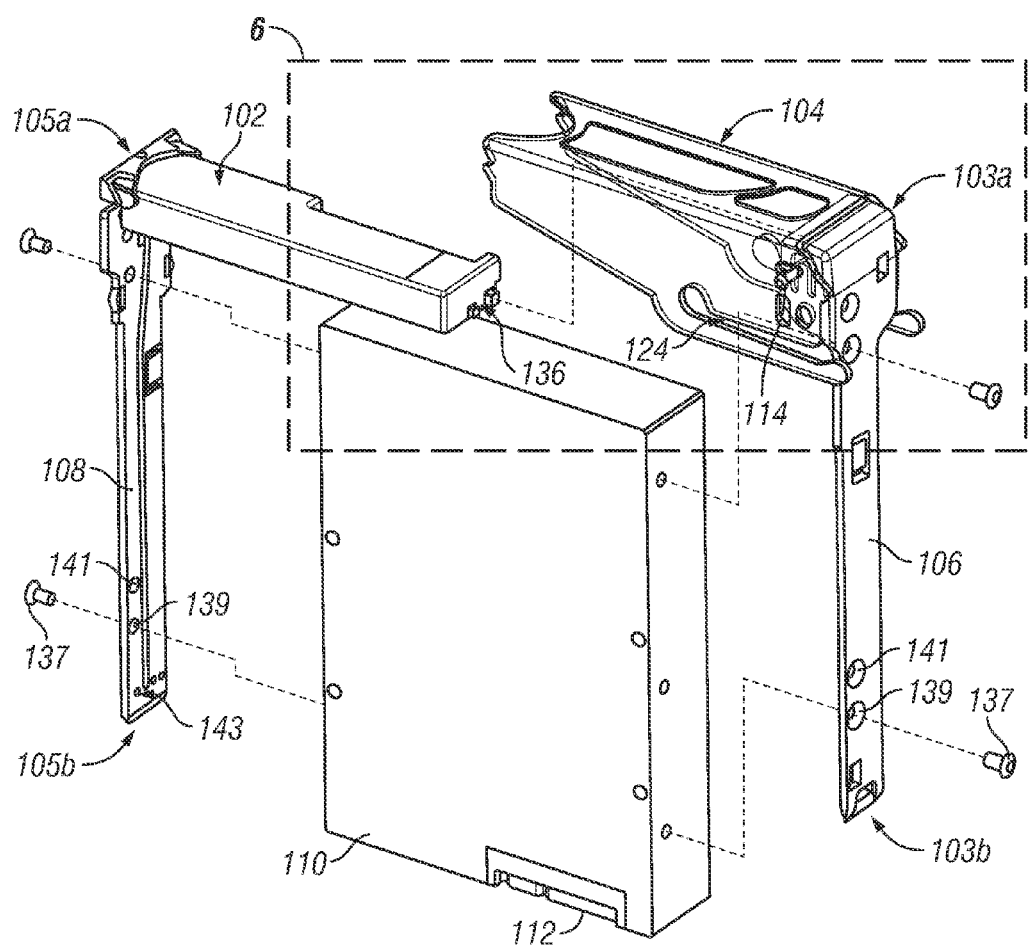
FIG. 5 illustrates an exploded perspective view of the carrier mechanism of FIG. 1 in a partially assembled first configuration, according to one aspect.

FIG. 5 illustrates an exploded perspective view of the carrier mechanism of FIG. 1 in a partially assembled first configuration, according to one aspect. In FIG. 5, the interposer device 102 may be secured to the second side rail 108 and the pull handle 104 may be secured to the first side rail 106. As shown, the interposer device 102 may be located at the front end of the data storage device 110 when the data storage device 110 is placed within the carrier mechanism and the interposer device 102 is not in use. The interposer device 102, as described above, may engage the first and second side rails 106 and 108 to provide structural rigidity for the first rail top end 103a and the second rail top end 105a. The pull handle 104 may then be pivotably coupled to the first side rail 106 over the interposer device 102.

Figure 6:
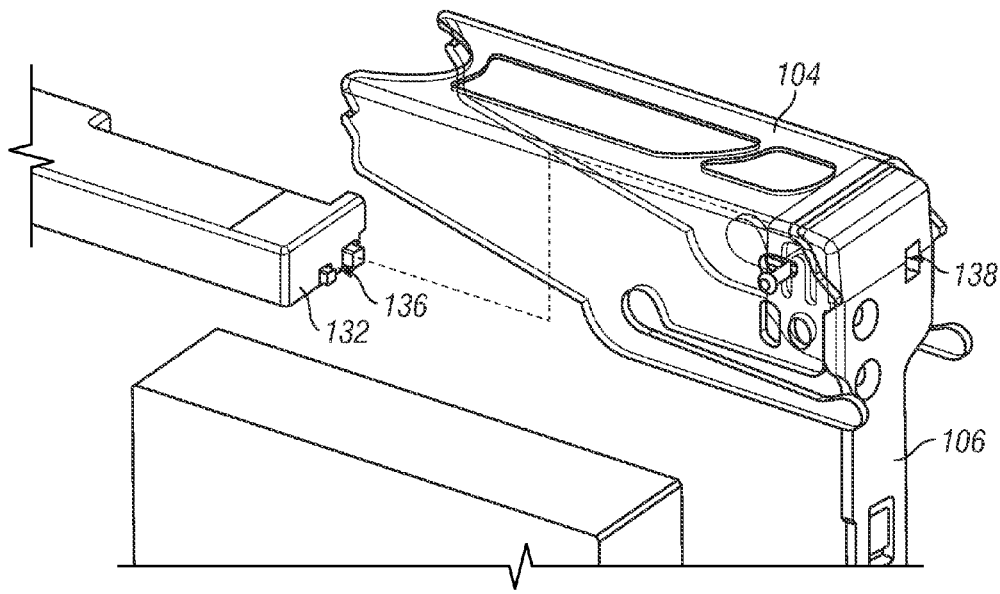
FIG. 6 illustrates a close-up outer side perspective view of the interposer device coupling to a first side rail in FIG. 5.

FIG. 6 illustrates a close-up outer side perspective view of the interposer device coupling to the first side rail 106 in FIG. 5. As discussed above, the first end wall 132 of the interposer device 102 may include one or more card fastening members 136, extending outwardly and integrally connected to the first end wall 132, which may be inserted into, and engaged with, one or more card attachment points 138 (See FIG. 7) of the first side rail 106 for coupling the interposer device 102 to the first rail top end 103a of the first side rail 106.

Figure 7:
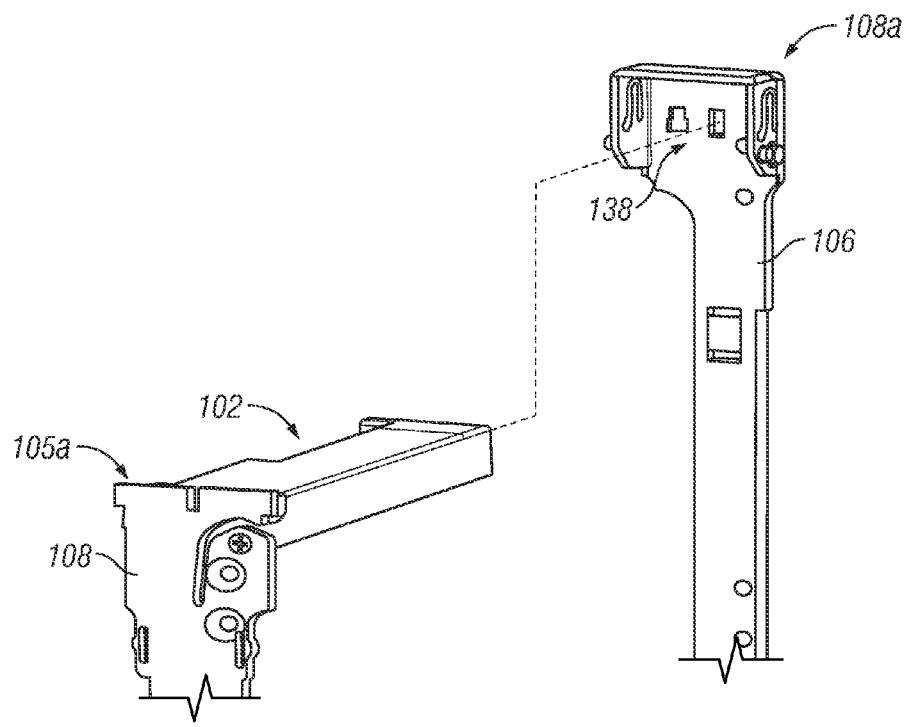
FIG. 7 illustrates a close-up inner side perspective view of the interposer device, secured to the second side rail, coupling to the first side rail when in the first configuration.

FIG. 7 illustrates a close-up inner side perspective view of the interposer device 102, secured to the second side rail 108, coupling to the first side rail 106 at a front end of the carrier mechanism, in accordance with the first configuration. As discussed above, the interposer device 102 may be coupled to the first side rail 106 by inserting the one or more card fastening members 136 in the first end wall 132 of the interposer device 102 into, and engaging with, one or more upper card attachment points 138 of the first side rail 106.

Figure 8:
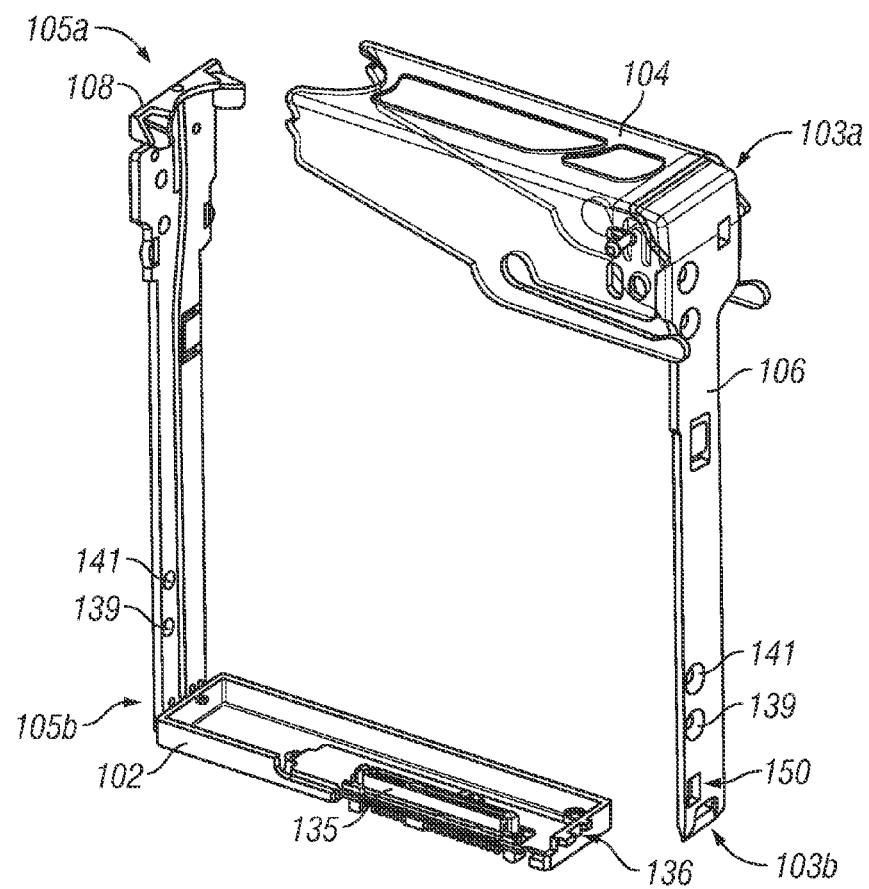
FIG. 8 illustrates an exploded perspective view of the carrier mechanism of FIG. 2 in a partially assembled second configuration, in accordance with one aspect.

FIG. 8 illustrates an exploded perspective view of the carrier mechanism in a partially assembled second configuration, in accordance with one aspect. As shown, the interposer device 102 may be secured to the second rail bottom end of the second side rail 108 and coupled to the first rail bottom end of the first side rail 106.

Figure 9:
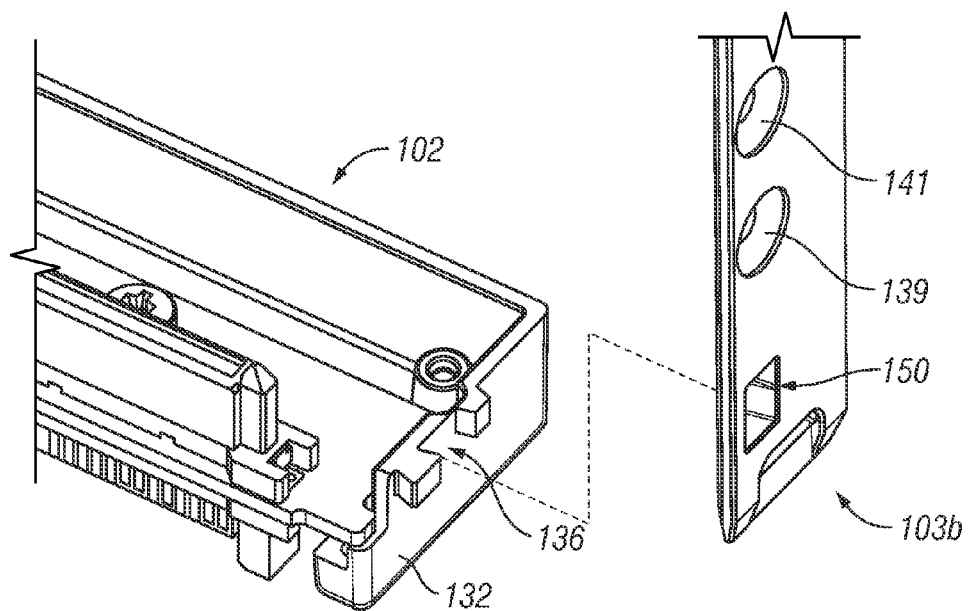
FIG. 9 illustrates a close-up outer side perspective view of the interposer device coupling to the first side rail in FIG. 8.

FIG. 9 illustrates a close-up outer side perspective view of the interposer device coupling to the first side rail 106 at a back end of the carrier mechanism, according to the second configuration. In the second configuration, as discussed above, the interposer device 102 may include one or more card fastening members 136, extending outwardly and integrally connected to the first end wall 132, which may be inserted into, and engaged with, one or more lower card attachment points 150 on the first rail bottom end 103b of the first side rail 106.

Figure 10:
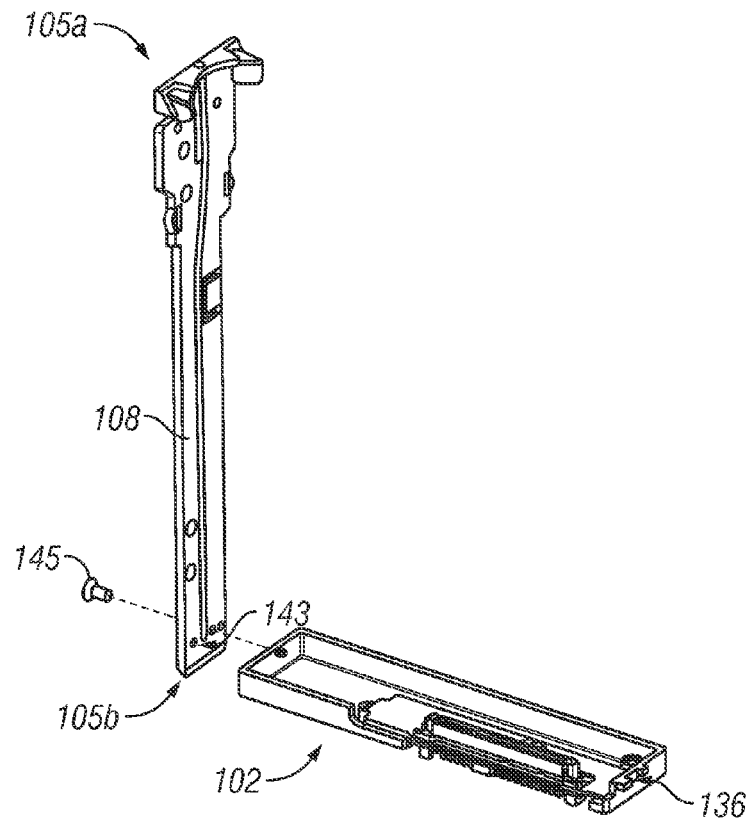
FIG. 10 illustrates an inner side perspective view of the interposer device coupling to the second side rail in the second configuration.
Figure 11:
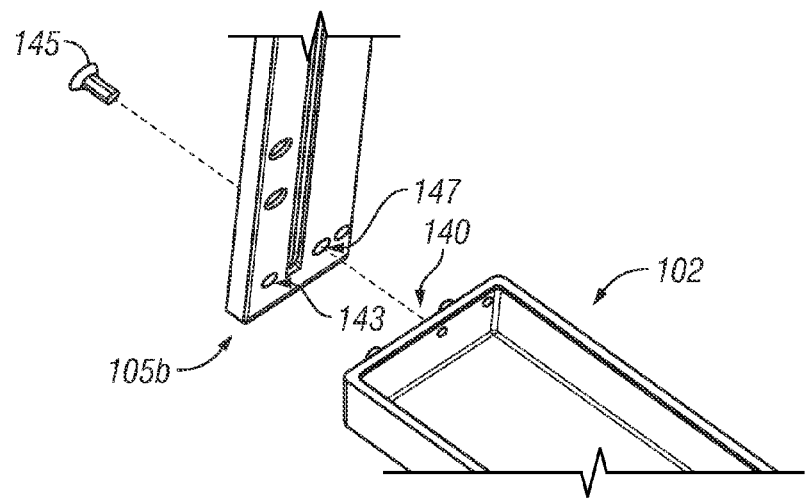
FIG. 11 illustrates a close-up inner side perspective view of the interposer device coupling to the second side rail in FIG. 10.

FIG. 10 illustrates an inner side perspective view of the interposer device coupling to a second side rail at a back end of the carrier mechanism in the second configuration and FIG. 11 illustrates a close-up inner side perspective view of the interposer device coupling to the second side rail in FIG. 10. When coupling the interposer device 102 to the second rail bottom end 105a of the second rail, one or more card fastener protrusions 140, extending outwardly and integrally connected to the second wall 134 of the interposer device 102, may be received by one or more lower card attachment holes 143 in the second rail bottom end 105b. Once coupled together, a fastener 145 may be inserted through a hole 147 in the second rail bottom end 105b of the second side rail 108 and into the aperture 148 (See FIG. 3) in the second end wall 134 of the interposer device 102 for securing the second side rail 108 to the interposer device 102.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A data storage device carrier mechanism, comprising:
    at least two side rails adapted to attach to a data storage device, a first side rail of the at least two side rails having a first rail top end and a first rail bottom end and a second side rail of the at least two side rails having a second rail top end and a second rail bottom end; and
    an interposer device interchangeable between a first configuration and a second configuration, the interposer device coupled to the first rail top end and the second rail top end when in the first configuration and coupled to the first rail bottom end and the second rail bottom end when in the second configuration.

2. The data storage device carrier mechanism of claim 1, further comprising:
    a pull handle pivotably coupled to the first rail top end, the pull handle comprising a first pull handle side and a second pull handle side extending upwardly and integrally connected to a top pull handle side.

3. The data storage device carrier mechanism of claim 2, wherein the pull handle is adapted to fit over the interposer device when the interposer device is assembled in the first configuration.

4. The data storage device carrier mechanism of claim 1, wherein the interposer device is communicatively coupled to a data interface for the data storage device when in the second configuration.

5. The data storage device carrier mechanism of claim 1, wherein the at least two side rails are shifted in position relative to the data storage device when changing between the first and second configurations.

6. The data storage device carrier mechanism of claim 5, wherein each of the at least two side rails include a first attachment point and a second attachment point for securing the data storage device to the at least two side rails, wherein the data storage device is secured at the first attachment point when in the first configuration and secured at the second attachment point when in the second configuration.

7. The data storage device carrier mechanism of claim 1, wherein the interposer device comprises:
    a flat surface;
    first and second sidewalls;
    first and second end walls, the sidewalls and the end walls integrally connected to, and extending continuously from, the flat surface;
    one or more one fastening members extending outwardly and integrally connected to the first end wall, the one or more one fastening members for releasable engagement with the carrier mechanism; and
    one or more one fastening protrusions extending outwardly and integrally connected to the second end wall, the one or more one fastening protrusions for releasable engagement with the carrier mechanism.

8. The data storage device carrier mechanism of claim 7, wherein the first rail top end includes one or more upper card attachment points for receiving the one or more card fastening members located on the first end wall of the interposer device when the interposer device is in the first configuration.

9. The data storage device carrier mechanism of claim 8, wherein the second rail top end includes one or more upper card attachment holes for receiving the one or more card fastening protrusions located on the second end wall of the interposer device when the interposer device is in the first configuration.

10. The data storage device carrier mechanism of claim 9, wherein a fastener is inserted through a hole in the second rail top end and into an aperture in the interposer device securing the interposer device to the second rail.

11. The data storage device carrier mechanism of claim 7, wherein the first rail bottom end includes one or more lower card attachment points located on the first rail bottom end for receiving the one or more card fastening members located on the first side wall of the interposer device when the interposer device is in the second configuration.

12. The data storage device carrier mechanism of claim 11, wherein the second rail bottom end includes one or more lower card attachment points for receiving the one or more card fastening protrusions located on the second wall of the interposer device when the interposer device is in the second configuration.

13. A data storage device carrier mechanism, comprising:
    at least two side rails adapted to attach to a data storage device, a first side rail of the at least two side rails having a first rail top end and a first rail bottom end and a second side rail of the at least two side rails having a second rail top end and a second rail bottom end; and
    an interposer device interchangeable between a first configuration and a second configuration, the interposer device coupled to the first rail top end and the second rail top end when in the first configuration and coupled to the first rail bottom end rail and the second rail bottom end when in the second configuration, the at least two side rails shifted in position relative to the data storage device when changing between the first and second configurations.

14. The data storage device carrier mechanism of claim 13, wherein each of the at least two side rails include a first attachment point and a second attachment point for securing the data storage device to the at least two side rails, wherein the data storage device is secured at the first attachment point when in the first configuration and secured at the second attachment point when in the second configuration.

15. The data storage device carrier mechanism of claim 13, wherein the interposer device is communicatively coupled to a data interface for the data storage device when in the second configuration, the interposer device including an electrical connector that converts the data interface from a first type of data interface to a second type of data interface.

16. An interposer device for a data storage device carrier mechanism, comprising:
   a flat surface;
   first and second sidewalls;
   first and second end walls, the sidewalls and the end walls integrally connected to, and extending continuously from, the flat surface;
   at least one fastening member extending outwardly and integrally connected to the first end wall, the at least one fastening member for releasable engagement with the carrier mechanism; and
   at least one fastening protrusion extending outwardly and integrally connected to the second end wall, the at least one fastening protrusion for releasable engagement with the carrier mechanism.

17. The interposer device of claim 16, wherein the card is interchangeable between a first configuration and a second configuration.

18. The interposer device of claim 17, wherein the carrier mechanism comprises a first side rail and a second side rail adapted to attach to a data storage device, the first side rail having a first rail top end and a first rail bottom end and the second side rail having a second rail top end and a second rail bottom end;
   wherein the at least one fastening member of the interposer device is inserted into at least one upper card attachment point on the first rail top end and the least one fastening protrusion of the interposer device inserted into the second rail top end when in the first configuration; and
   wherein the at least one fastening member of the interposer device is inserted into at least one lower card attachment point on the first rail bottom end and the least one fastening protrusion inserted into the second rail bottom end when in the second configuration.

19. The interposer device of claim 18, wherein the interposer device is communicatively coupled to a data interface for the data storage device when in the second configuration.

20. The interposer device of claim 18, wherein the first and second side rails are shifted in position relative to the data storage device when changing between the first and second configurations.

* * * * *